Nov. 22, 1932.   E. FRIEDLÄNDER   1,888,716
RELAYING SYSTEM
Filed Aug. 30, 1929

INVENTOR
Erich Friedländer
BY
ATTORNEY

Patented Nov. 22, 1932

1,888,718

UNITED STATES PATENT OFFICE

ERICH FRIEDLÄNDER, OF SPANDAU, NEAR BERLIN, GERMANY, ASSIGNOR TO WESTINGHOUSE ELECTRIC & MANUFACTURING COMPANY, A CORPORATION OF PENNSYLVANIA

RELAYING SYSTEM

Application filed August 30, 1929, Serial No. 389,870, and in Germany September 26, 1928.

My invention relates to electrical metering and protective systems for alternating current circuits.

In order to secure greater sensitivity in metering and protective systems, associated with alternating current circuits, it has been proposed to rectify current derived from the circuit and to energize a direct current instrument with the rectified quantity. When such an expedient is applied to a polyphase circuit, however, complications result in that a separate instrument must be provided for each phase and they are individually responsive only to the electrical quantities of the phase to which they are associated. As a result, such installations are expensive and they do not afford means responsive to the circuit as a whole.

It is an object of my invention, therefore, to provide in conjunction with a polyphase alternating-current circuit, means whereby a single direct-current instrument may be energized in accordance with the electrical quantities of the circuit.

A further object of my invention is to provide means operative in accordance with the sum or difference of quantities derived from a polyphase circuit.

Another object of my invention is to provide means for deriving a plurality of direct-current voltages from an alternating-current circuit and to energize a single direct-current instrument in accordance therewith.

Another object of my invention is to provide a single means operative in accordance with the quotient or product of quantities derived from an alternating-current power circuit.

In practicing my invention, I provide means including rectifiers for deriving a plurality of direct-current voltages from an alternating-current circuit, a single direct-current instrument, and circuit connections for energizing said instrument in accordance with the resultant magnitude of the plurality of direct-current voltages. Although my invention is equally applicable for relay and metering purposes, it is of particular interest with respect to relay protective systems and the greater emphasis is placed on that phase of the invention hereinafter.

Figure 3:
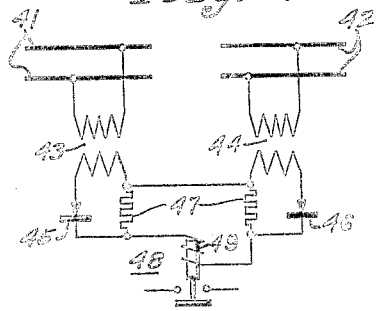
Figure 4:
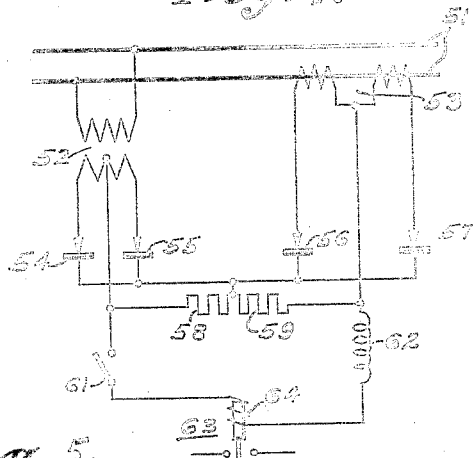
Figure 5:
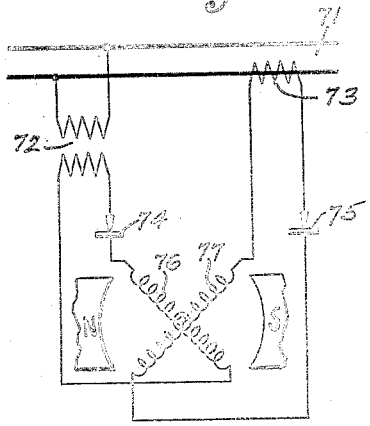

In the drawing, Figs. 1, 2, 3 and 4 are schematic illustrations of various relay protective systems embodying my invention, and Fig. 5 is a schematic illustration of my invention applicable to metering purposes.

Figure 1:
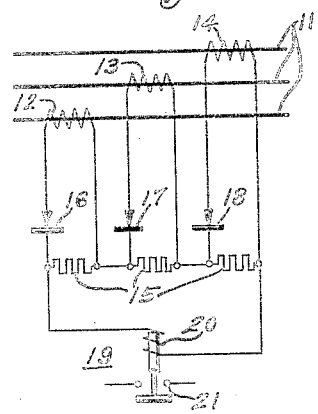

In Fig. 1 of the drawing, I have represented one embodiment of my invention wherein a single relay is energized from a three-phase system on the occurrence of an over-current, or the failure of any of the phase voltages or currents of the said system. I have shown a three-phase system 11 in the phases of which current transformers 12, 13 and 14 are inserted, having the secondaries thereof each connected in series with a resistance 15 through dry rectifiers 16, 17 and 18. The voltage drop across the series connected resistors 15 serves to energize the magnet winding 20 of the relay 19.

When the phase currents in the circuit 11 are balanced, the current transformers 12, 13 and 14 are energized in accordance therewith. The dry rectifiers 16, 17 and 18, in the respective circuits of the said transformers, rectify the current in the said circuits, thus permitting a direct current to flow through the resistors 15. Under balanced current conditions in the three-phase circuit 11, the currents flowing in the various resistors 15 are neutralized and there is no voltage drop across the three resistors.

Since the direct-current which flows through the magnet winding 20 of the relay 19 is proportional to the algebraic sums of the three voltages obtained by rectifying the alternating currents in the separate phases, upon an over-current or failure of any of the phase voltages or currents, the magnet winding 20 of the switch 19 will be energized in accordance with the resultant voltage drop across the resistors 15.

The relay 19 may be provided with a dashpot (not shown) or some other suitable means well known to the art for introducing a time element in its operation. The energization of the magnet coil 20 closes the contacts 21 to complete a protective circuit for the main system or to actuate controls for such purposes. Measuring or indicating means may also be energized, similarly to the operation of the relay 19, to afford means whereby phase unbalance or phase failure may be noted.

In Fig. 1 the resistors 15 may be dispensed with and the secondaries of the current transformers 12, 13 and 14 connected in parallel, thereby providing an energizing current for the relay 19 which is proportional to the greatest current in one of the three transformers. Consequently, such an arrangement is particularly suitable for over-current protective systems which heretofore required a plurality of relays.

Figure 2:
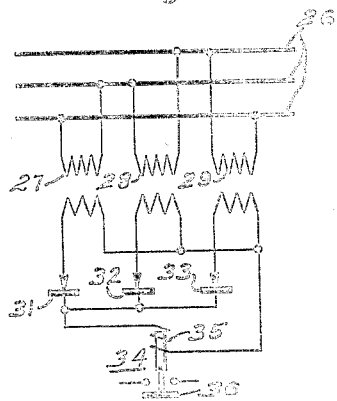

In Fig. 2, I have shown another embodiment of my invention wherein voltage transformers 27, 28 and 29 are connected to the different phases of a polyphase system 26. The secondaries of each of the transformers are connected in circuit with dry rectifiers 31, 32 and 33, and the three circuit sections 27—31, 28—32 and 29—33 are connected in parallel with each other. The winding 35 of the switch 34 is thereby energized by a current which is proportional to the greatest voltage occurring on one of the voltage transformers 27, 28, and 29.

In the event of an over-voltage on any phase of the system 26, the transformers 27, 28 and 29 provide the rectifiers 31, 32 and 33 with an unbalanced voltage, and the resultant rectified current energizes the magnet winding 35 of the relay 34; the said energizing current being proportional to the degree of voltage unbalance. The energization of the coil 35 causes the switch 34 to close its contacts 36 to energize a desired protective or control circuit.

A modification of this arrangement, whereby the magnet winding of the switch 34 may be energized by a current corresponding to the average value of the A. C. currents, is obtained by loading the secondaries of the transformers 27, 28 and 29 with resistances through associated rectifiers 31, 32 and 33. This arrangement is similar to that shown in Fig. 1 with the exception of the type of transformers used.

In Fig. 3, I have illustrated my invention as applied to two independent alternating-current networks. In this case I provide a single relay to effect a control of the predetermined relative voltages of the two networks.

In each of two independent A. C. networks 41 and 42 there is connected a voltage transformer 43 and 44, respectively. The secondary windings of these transformers are connected through rectifiers 45 and 46 to resistors 47 in such manner that the D. C. voltages across the resistors are in opposition. In this arrangement the magnet winding 49 of the relay 48 is energized by a direct current proportional to the difference between the effective values of the voltage in the A. C. networks 41 and 42.

The above scheme may be modified in that current transformers may be used instead of the voltage transformers, thereby causing the magnet winding of the relay to be traversed by a direct current, the strength of which is proportional to the difference between the effective values of the current in the A. C. networks.

Another scheme embodying my invention involves a comparison of the voltage and current of an electric system. This method, as shown in Fig. 4, entails the use of a voltage transformer 52 and a current transformer 53, the respective secondaries of which are connected together through rectifiers 54, 55, 56 and 57 to load resistances 58 and 59 and the associated relay circuit, as indicated in the drawing. The coil 64 of the relay 63 is energized by a current proportional to the voltage drop across the opposing resistances 58 and 59. This magnetizing current is proportional to the difference between the current and the voltage of the A. C. source 51 where the current and voltage vary in accordance with the transformation ratio of the transformers 52 and 53 and the magnitude of the resistances 58 and 59.

The relay 63 will operate in the manner of a so-called impedance relay, when the switch 61 is closed, in the event of a disturbance. The inductive resistance of the choke coil 62 has a predetermined value so that the closing of switch 61 will cause the current to rise therein according to an exponential curve. The magnetizing current of the magnet winding 64 will rise the more rapidly, therefore, and actuate the relay for smaller values of voltage and for greater values of current existing in the A. C. source. This arrangement is particularly applicable for selective protection and may be modified so that only the part of the rectified voltage dependent upon the increase of the current in the A. C. system will conform to an exponential curve.

According to the arrangement in Fig. 5, the magnet winding of the controlling device consists of two portions 76 and 77, one of which is arranged in the secondary circuit of a voltage transformer 72 and the other in the secondary circuit of the current transformer 73. Rectifiers 74 and 75 are disposed in the secondary circuits of the transformers; said transformers being connected to an A. C. system 71.

The two windings 76 and 77 are connected to each other as cross-coils at a fixed angle, and may be rotated as a unit between the poles of a permanent magnet, as shown in the drawing. The degree of rotation of the coil assembly is proportional to the quotients of the A. C. voltage and current, that is, depending on the impedance of the A. C. circuit, and independent of the phase displacement between current and voltage. This relation can be used either to determine the position of a fault on the occurrence of a short circuit, or to adjust a stop, by means of a switch device, for a contact rotating with pre-determined speed, in the manner used in a known type of impedance relay.

The arrangement, according to Fig. 5, can be connected with the arrangement shown in Fig. 4 in such a manner that when the impedance falls below a definite limiting value, a contact is closed by the device 76, 77, which, in turn, causes the closure of the switch 61 arranged in the energizing circuit of the relay 63 (Fig. 4).

The application of my invention to apparent-power meters is obvious because the product of the A. C. voltage and current will cause such a device to operate similarly to a wattmeter.

It is to be understood that my invention is not limited to the type of rectifiers shown, since any other kind of rectification may be used with advantage.

If rectifiers composed of separate elements, for example, copper oxide rectifiers are used for rectifying the A. C. voltage, the current-voltage characteristic of which does not follow a straight line, then it is difficult to ensure that the arrangement will always operate faultlessly, that is, in such a manner that the device under control will respond exactly at the instant at which the departure between the two A. C. magnitudes to be compared takes place.

In other words, in each case, the number of series connected rectifier elements and the transformation ratio of the associated transformer must be so related that, after completed comparison, the same A. C. voltage is applied to each rectifier element, and the ohmic value of the associated resistances must be so dimensioned that after completed comparison, each rectifier element is traversed by a direct current of equal strength. If any of the transformers necessitate a change of transformation ratio, in accordance with the above requirements, the proper total transformation ratio may be created by the use of an intermediate transformer. It is obvious that the ohmic values of the associated resistances may be varied to insure that each rectifier element is traversed by a direct current of equal strength and the apparatus to be controlled should always be connected between such points of the resistances which show equal potential after completed comparison.

My invention is not limited to applications for electromagnet switching, measuring or indicating devices, as is easily apparent and it is therefore understood that no such limitations will be imposed on my invention beyond the scope of the appended claims.

I claim as my invention:

1. In combination with a polyphase circuit, means responsive to an unbalanced current condition on the phases of said circuit comprising a relay, and means for energizing said relay in accordance with the unbalance between rectified currents derived from said circuit respectively proportional to the phase currents thereof.

2. In a polyphase circuit, means for deriving rectified currents therefrom respectively proportional to the phase currents of the circuit, and means including a relay energized in accordance with the algebraic sum of the rectified quantities for all values of current occurring in said circuit.

3. In a polyphase circuit, a single relay energized by a direct current proportional to a voltage drop across a plurality of resistors, said resistors having a voltage applied thereto by means including rectifying means energized from said circuit.

4. In combination with a polyphase circuit, means responsive to an unbalanced condition on the phases of said circuit including a single relay, and means for energizing said relay only in accordance with the unbalance between rectified currents derived from said circuit respectively proportional to an electrical quantity thereof.

5. In a polyphase circuit, a plurality of means for deriving rectified currents therefrom respectively proportional to an electrical quantity of the circuit, and means including a single relay energized only in accordance with the algebraic sum of said rectified currents for all values of voltage occurring in said circuit.

6. In a polyphase system, means including means for deriving a plurality of rectified currents from said system, for solely actuating a single relay upon the occurrence of a change in an electrical quantity of any of the phases of the said system.

7. In a polyphase system, means for deriving substantially equal rectified quantities therefrom, resistors traversed by said rectified quantities, and a single relay connected across said resistors for enerdization in accordance with the voltage drop across said resistors.

8. In combination with two separate A. C. networks, means for deriving rectified quantities from each network a single relay and means for effecting the energization thereof in accordance with a predetermined difference between said rectified quantities.

9. In an alternating-current system, means for effecting an impedance control including, in combination, voltage-transforming means associated with said system, current-transforming means associated with said system, rectifying means associated with the secondary circuits of both of said transforming means, and control means energized from said transforming means through said rectifying means for effecting an impedance indication.

10. The combination, in an alternating-current system, of rectifying means, means associated with said system and said rectifying means for energizing said rectifying means in accordance with the system voltage, a second rectifying means, means associated with said system and said second rectifying means for energizing said second rectifying means in accordance with the system current, and relay means energized through said rectifying means for effecting a control in accordance with the system impedance.

11. In an alternating-current system, the combination of transforming means associated therewith, rectifying means associated with said transforming means and adapted to supply a plurality of rectified currents from said system and a single electro-responsive means energized solely in accordance with the rectified currents for effecting a control indication in accordance with the system conditions.

In testimony whereof, I have hereunto subscribed my name this 22nd day of July, 1920 at Berlin-Siemensstadt, Germany.

ERICH FRIEDLÄNDER.